United States Patent [19]

Uekita et al.

[11] Patent Number: 4,868,281

[45] Date of Patent: Sep. 19, 1989

[54] IONIC BOND CONTAINING CONDENSATION POLYMERS

[75] Inventors: Masakazu Uekita; Hiroshi Awaji, both of Hyogo, Japan

[73] Assignee: Kanegafuchi Kagaku Kogyo Kabushiki Kaisha, Osaka, Japan

[21] Appl. No.: 63,953

[22] Filed: Jun. 19, 1987

[30] Foreign Application Priority Data

Jun. 20, 1986 [JP] Japan .................................. 61-145714

[51] Int. Cl.$^4$ .............................................. C08G 69/26
[52] U.S. Cl. .................................... 528/353; 264/298; 428/411.1; 528/33; 528/310; 528/331; 528/339; 528/348; 528/350
[58] Field of Search ............... 528/353, 350, 310, 292, 528/288, 289, 292, 331, 348, 349; 260/DIG. 31

[56] References Cited

U.S. PATENT DOCUMENTS

| | | |
|---|---|---|
| 2,999,056 | 9/1961 | Tanner . |
| 3,409,595 | 11/1968 | Muller . |
| 4,150,216 | 4/1979 | Quack .................................. 528/290 |
| 4,433,130 | 2/1984 | Hartman ............................. 528/173 |

*Primary Examiner*—Christopher Henderson
*Attorney, Agent, or Firm*—Armstrong, Nikaido, Marmelstein, Kubovcik & Murray

[57] ABSTRACT

A polymer has a linear recurring unit in which a first organic group ($R_1$) having at least two carbon atoms and a valence of at least three and a second organic group ($R_2$) having at least two carbon atoms and a valence of at least two are bonded together alternatively through a divalent connecting group, and containing at least one hydrocarbon group ($R_3$) having 10 to 30 carbon atoms which is linked to the recurring unit by an ionic bond and which may be substituted.

12 Claims, No Drawings

IONIC BOND CONTAINING CONDENSATION POLYMERS

BACKGROUND OF THE INVENTION

1. Field of the Invention

The present invention relates to ionic bond containing polymers and more particularly to polymers modified so as to be capable of being formed into a film by the Langmuir-Blodgett method.

2. Description of Prior Art

It was found by Langmuir and Blodgett in 1930s that fatty acids having ca. 16 to 22 carbon atoms can form a monomolecular film on the surface of water and such films can be built-up or laminated on a substrate. However, it is only in recent years that investigations on their technical application has been started.

Investigations which have heretofore been made are summarized in *Kotai Butsuri* (*Physics of Solids*), 17 (12), p. 45 (1982); *Thin Solid Film*, 68, No. 1 (1980); ibid., 99, Nos. 1, 2 and 3 (1983); G.L. Gains, *Insoluble Monolayers at Liquid-Gas Interface*, Interscience Publishers, New York (1966); and so forth. However, conventional Langmuir-Blodgett films (hereinafter referred to as "LB films") of saturated straight chain carboxylic acids are not satisfactory in heat resistance and mechanical strength and, therefore, cannot be put into practical use as they are.

In order to rectify the above disadvantages, investigations have been made on polymeric films of unsaturated fatty acids such as ω-tricosenic acid, ω-heptadecenic acid and α-octadecylacrylic acid, fatty acid unsaturated esters such as vinyl stearate and octadecyl acrylate, or diacetylene derivatives, for example. These films, however, are not sufficiently high in heat resistance and cannot be said to be excellent in electrical properties.

It is known that hydrophilic group-containing polymers such as polyacrylic acid, polyvinyl alcohol, polyethyl acrylate and polypeptide also have film-forming properties. No investigation, however, has been made on modified polymers to be used as a material, particularly for preparation of LB films, and an excellent LB film material has not yet been discovered.

Polyimide provides a heat resistant film. The thickness of polyimide film produced by techniques such as spin coating is greater than 1,000 Å; usually, a heat resistant thin film having a thickness of from 1 μm to 1,000 Å and with no pinhole formed therein is very difficult to produce.

On the other hand, a polyimide film is known as a heat resisting film but in the case of forming the film thereof by spin coating, etc., which is known to be a coating method for forming the thinnest film of such a polymer, the thickness of the film formed is at best not thinner than 1,000 Å and is usually thicker than about 1 μm. In other words, it is very difficult to form a heat resisting thin film of thinner than 1,000 Å having no pinholes by using such a polymer.

SUMMARY OF THE INVENTION

It is an object of the present invention to make it possible to form films in accordance with Langmuir-Blodgett technique, by means of modification of high polymers which could hardly be formed into a film by Langmuir-Blodgett technique.

It is another object of the present invention to provide a polymer film which is improved in heat resistance, chemical resistance, and mechanical characteristics such as adhesion force, and which has a thickness that could be not generally be obtained.

It has been found that the objects can be attained by introducing a substituent to impart hydrophobic properties into the recurring unit of polymers.

The present invention relates to a polymer having a linear recurring unit in which a first organic group, $R_1$, having at least two carbon atoms and a valency of at least 3 and a second organic group, $R_2$, having at least two carbon atoms and a valency of at least 2 are bonded together alternatively through a divalent bonding group, and containing at least one hydrocarbon group, $R_3$, having 10 to 30 carbon atoms which is linked to the recurring unit by ionic bond and which may contain a substituent.

DETAILED DESCRIPTION OF THE INVENTION

One of LB film materials to be used in the present invention is a polymer having a linear recurring unit in which a first organic group, $R_1$, having at least two carbon atoms and valency of at least 3 and a second organic group, $R_2$, having at least two carbon atoms and a valency of at least 2 are bonded together alternatively through a divalent bonding group, and containing at least one hydrocarbon group, $R_3$, having 10 to 30 carbon atoms which is linked to the recurring unit by ionic bond and which may contain a substituent.

Cases in which the valence of $R_1$ is equal to that of $R_2$ or the valence of $R_1$ is greater than that of $R_2$, but up to 6 are shown below, although the present invention is not limited thereto.

|     | Valence of $R_1$ | Valence of $R_2$ |
|-----|------------------|------------------|
| 1.  | 3                | 2                |
| 2.  | 4                | 2                |
| 3.  | 5                | 2                |
| 4.  | 6                | 2                |
| 5.  | 3                | 3                |
| 6.  | 4                | 3                |
| 7.  | 5                | 3                |
| 8.  | 6                | 3                |
| 9.  | 4                | 4                |
| 10. | 5                | 4                |
| 11. | 6                | 4                |
| 12. | 5                | 5                |
| 13. | 6                | 5                |
| 14. | 6                | 6                |

Although cases wherein the valences of $R_1$ and $R_2$ are 5 or more, compounds in which the valences of $R_1$ and $R_2$ are up to 4 are preferred.

Specific examples of linear recurring units comprising combinations of $R_1$ and $R_2$ groups having the following valences are shown hereinbelow.

$R_1 = 3, R_2 = 2$
$R_1 = 4, R_2 = 2$
$R_1 = 3, R_2 = 3$
$R_1 = 4, R_2 = 3$
$R_1 = 4, R_2 = 4$

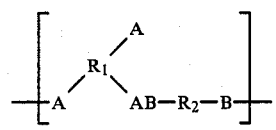 (1)

-continued
(2) 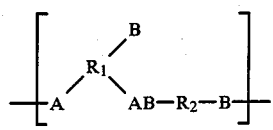
(3) 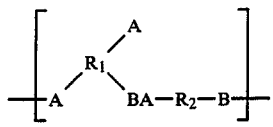
(4) 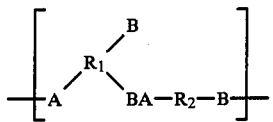
(5) 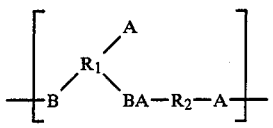
(6) 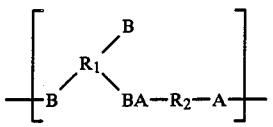
$R_1$ = valence of 4, $R_2$ = valence of 2
(7) 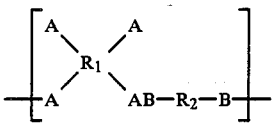
(8) 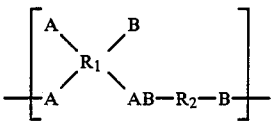
(9) 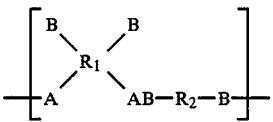
(10) 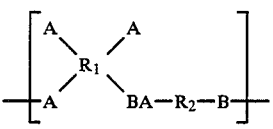
(11) 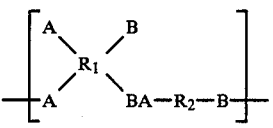
(12) 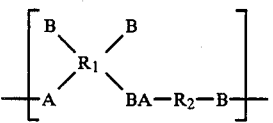
-continued
(13) 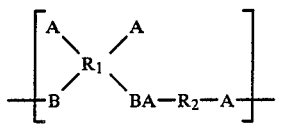
(14) 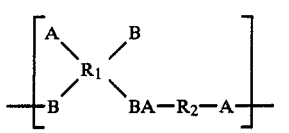
(15) 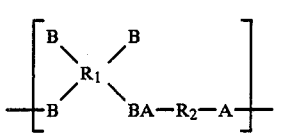
$R_1$ = valence of 3, $R_2$ = valence of 3
(16) 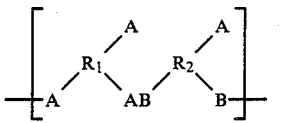
(17) 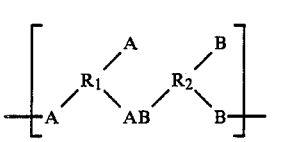
(18) 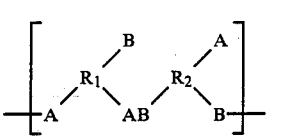
(19) 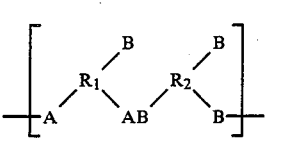
(20) 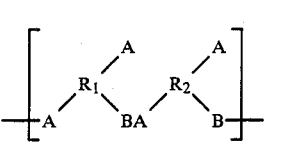
(21) 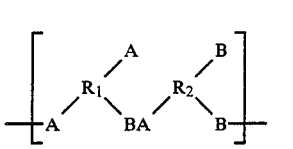
(22) 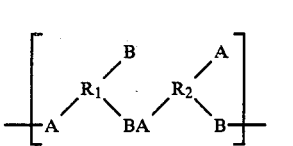
(23) 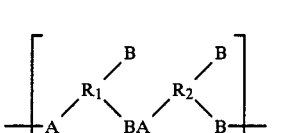

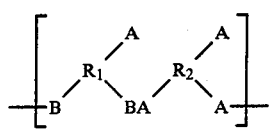 (24)
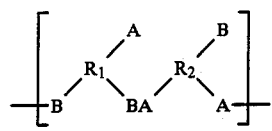 (25)
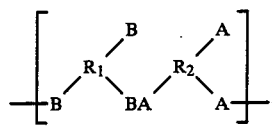 (26)
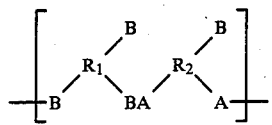 (27)
$R_1$ = valence of 4, $R_2$ = valence of 3
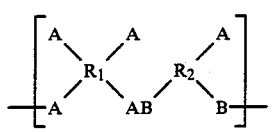 (28)
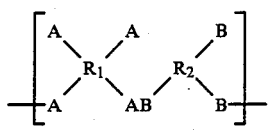 (29)
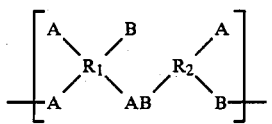 (30)
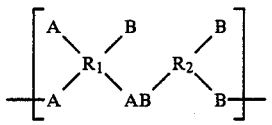 (31)
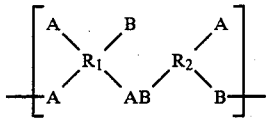 (32)
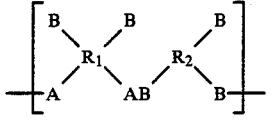 (33)
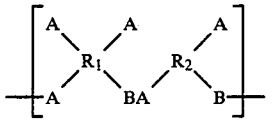 (34)
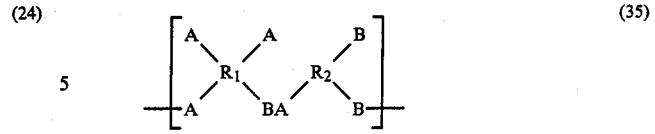 (35)
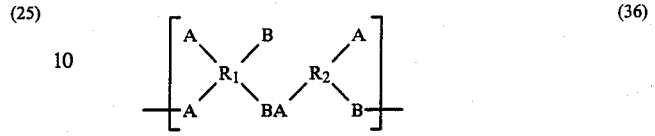 (36)
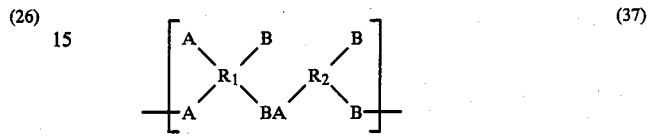 (37)
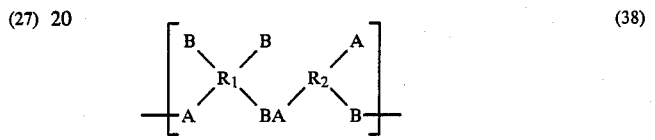 (38)
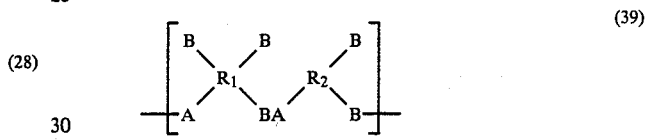 (39)
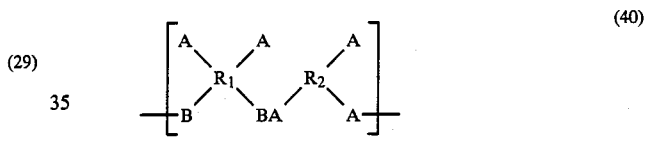 (40)
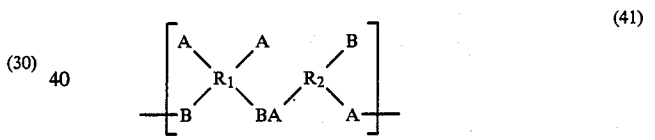 (41)
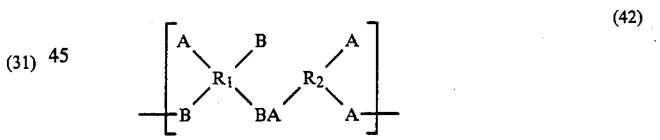 (42)
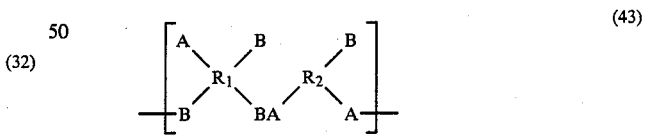 (43)
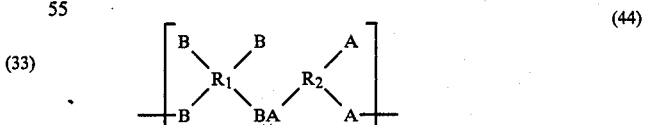 (44)
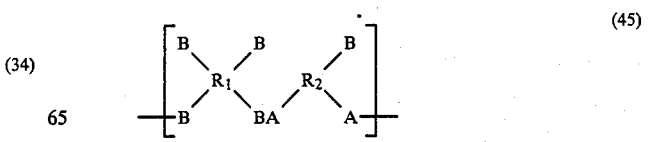 (45)
$R_1$ = valence of 4, $R_2$ = valence of 4

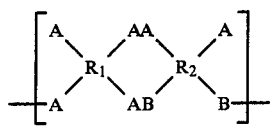 (46)
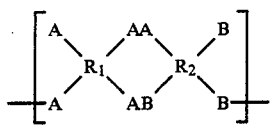 (47)
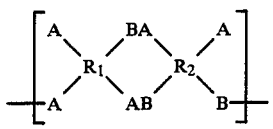 (48)
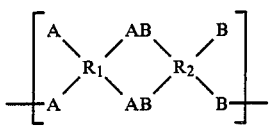 (49)
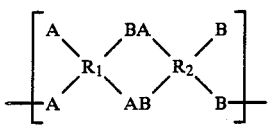 (50)
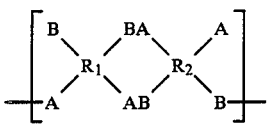 (51)
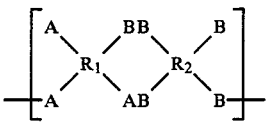 (52)
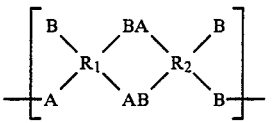 (53)
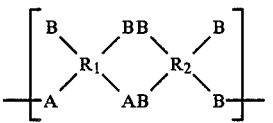 (54)
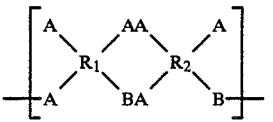 (55)
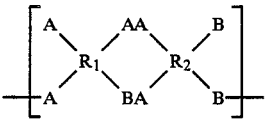 (56)
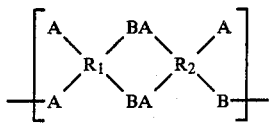 (57)
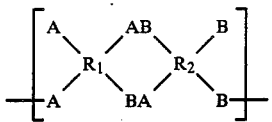 (58)
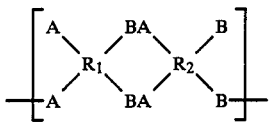 (59)
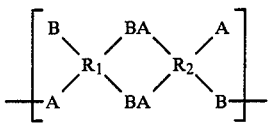 (60)
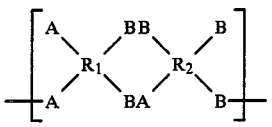 (61)
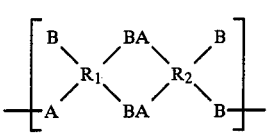 (62)
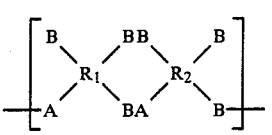 (63)
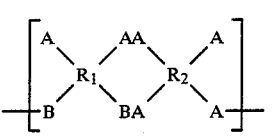 (64)
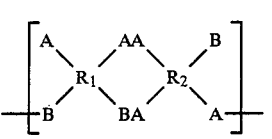 (65)
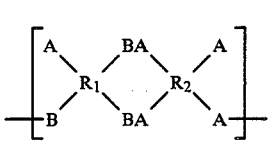 (66)
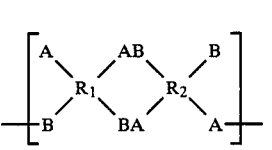 (67)

-continued $$\left[\begin{array}{c} A \diagdown_{BA} \diagup^B \\ R_1 \diagup \diagdown R_2 \\ -B \diagup^{BA} \diagdown_A - \end{array}\right] \quad (68)$$

$$\left[\begin{array}{c} B \diagdown_{BA} \diagup^A \\ R_1 \diagup \diagdown R_2 \\ -B \diagup^{BA} \diagdown_A - \end{array}\right] \quad (69)$$

$$\left[\begin{array}{c} A \diagdown_{BB} \diagup^B \\ R_1 \diagup \diagdown R_2 \\ -B \diagup^{BA} \diagdown_A - \end{array}\right] \quad (70)$$

$$\left[\begin{array}{c} B \diagdown_{BA} \diagup^B \\ R_1 \diagup \diagdown R_2 \\ -B \diagup^{BA} \diagdown_A - \end{array}\right] \quad (71)$$

$$\left[\begin{array}{c} B \diagdown_{BB} \diagup^B \\ R_1 \diagup \diagdown R_2 \\ -B \diagup^{BA} \diagdown_A - \end{array}\right] \quad (72)$$

In the formulae (1) to (72), AB and BA each represent a divalent connecting group formed by a reaction between an acidic group A and a basic group B wherein the groups A and B contain hetero atoms such as O, N, S, P and B. As examples of such groups, mention may be made of the following:

A: —COOR (wherein R represents an alkyl group or a hydrogen atom), —COX (wherein X represents Cl or Br and hereinafter refer to as the same meanings), —NCO, —NCS, —CN, —CONHR, —SO$_2$NHR, etc.

B: —NHR, —OR, —SR, —X, etc.

AB: $-\underset{\underset{O}{\parallel}}{C}NH-, -\underset{\underset{O}{\parallel}}{C}O-, -\underset{\underset{O}{\parallel}}{C}S-, -NH\underset{\underset{O}{\parallel}}{C}O-, -NH\underset{\underset{O}{\parallel}}{C}S-,$ $-NH\underset{\underset{S}{\parallel}}{C}O-, -NH\underset{\underset{S}{\parallel}}{C}S-,$ etc.

BA: $-NH\underset{\underset{O}{\parallel}}{C}-, -O\underset{\underset{O}{\parallel}}{C}-, -S\underset{\underset{O}{\parallel}}{C}-, -O\underset{\underset{O}{\parallel}}{C}NH-, -S\underset{\underset{O}{\parallel}}{C}NH-,$ $-NH\underset{\underset{S}{\parallel}}{C}S-, -O\underset{\underset{S}{\parallel}}{C}NH,$ etc.

In the formulae (1) to (72), there are present A/B which do not participate in the formation of the linear recurring unit. Through these substituents, at least one, preferably two hydrocarbon groups (R$_3$) which have 10 to 30 carbon atoms, preferably 16 to 22 carbon atoms, and which may have a substituent or substituents, are introduced by an ionic bond, so that film formation can be achieved by Langmuir-Blodgett technique.

With regard to A, for example, if A is —COOH, modification thereof is carried out as follows:

$$-\underset{\underset{O}{\parallel}}{C}O\overset{\ominus}{N}\underset{\underset{H}{\mid}}{\overset{R_3}{\overset{\oplus}{\diagup}}}\overset{R_4}{\diagdown}R_5$$

wherein R$_4$ and R$_5$ are each a hydrocarbon group having 1 to 30 carbon atoms which may be substituted, or a hydrogen atom, and preferably a hydrocarbon group having 1 to 4 carbon atoms or a hydrogen atom.

With regard to B, if B is —NH$_2$, —NHR$_4$, or $$-N\diagdown_{R_5}^{R_4},$$

modification thereof is carried out as follows:

$$-\overset{\oplus}{N}H_3\overset{\ominus}{O}\underset{\underset{O}{\parallel}}{C}R_3, \quad -\overset{\oplus}{N}H_2\overset{\ominus}{O}\underset{\underset{O}{\parallel}}{C}R_3, \quad -\overset{\oplus}{N}H\overset{\ominus}{O}\underset{\underset{O}{\parallel}}{C}R_3$$
$$\qquad\quad\; \mid \qquad\qquad \diagup \diagdown$$
$$\qquad\quad\; R_4 \qquad\qquad R_4 \; R_5$$

wherein R$_4$ and R$_5$ are as defined above.

R$_1$ and R$_2$ in the general formulae (1) to (72) are each at least trivalent group and at least divalent group, respectively, having at least two carbon atoms, preferably 5 to 20 carbon atoms. It may be an aromatic group; an alicyclic group; an aliphatic group; a group wherein an aromatic group and an aliphatic group are combined; a group wherein each of the above-mentioned groups is substituted by a monovalent group having 1 to 30 carbon atoms selected from the group consisting of an aliphatic group, an alicyclic group, an aromatic group, and a group in which an aliphatic group is combined with an alicyclic group or an aromatic group; or a group wherein each of the preceding groups is substituted by a monovalent group such as a halogen atom, nitro group, amino group, cyano group, methoxyl group or acetoxyl group, or by a group in which the above monovalent group bonds to —O—, —COO—, —NHCO—, —CO—, —S—, —CSS—, —NHCS—, —CS—, or the like. Groups characterized by benzenoid unsaturation having at least 6 carbon atoms are preferred as R$^1$ in points of heat resistance, chemical resistance and mechanical properties.

The term "benzenoid structure" refers herein to the structure of carbocyclic compounds as contained in ordinary aromatic compounds, as contrasted with quinoid structures.

p-quinoid

As specific examples of R$_1$ and R$_2$, mention may be made of the followings:

[benzene ring], [biphenyl],

[naphthalene],

[diphenyl-R₆ bridge structure], wherein R₆ represents $-(CH_2)_n-$ (n = 1~3), $-\underset{CH_3}{\overset{CH_3}{C}}-$, $-\underset{CF_3}{\overset{CF_3}{C}}-$, $-O-$, $-CO-$, $-S-$, $-SO_2-$, $-\underset{R_7}{N}-$, $-\underset{R_7}{\overset{R_7}{Si}}-$, $-O-\underset{R_7}{\overset{R_7}{Si}}-O-$, $-O-\underset{\overset{\|}{O}}{\overset{R_7}{P}}-O-$, $-\underset{\overset{\|}{O}}{\overset{R_7}{P}}-$ (in which R₇ represents an alkyl group or an aryl group).

[phenyl with two isopropyl/C(CH₃)₂CH₂ substituents]

[—CH₂—C(CH₃)₂—phenyl—O—phenyl—C(CH₃)₂—CH₂—]

[—(CH₂)₄—C(CH₃)₂—phenyl—C(CH₃)₂—(CH₂)₄—]

[m-xylylene —CH₂—phenyl—CH₂—]

[—cyclohexyl—CH₂—cyclohexyl—],

-continued $-(CH_2)_p-$ (p = 2-10), $-(CH_2)_4-\underset{H}{\overset{CH_3}{C}}-(CH_2)_2-$ $-(CH_2)_3-\underset{CH_3}{\overset{CH_3}{C}}-(CH_2)_3-$, $-(CH_2)-\underset{CH_3}{\overset{CH_3}{C}}-(CH_2)_3-$, $-(CH_2)_{10}\underset{}{CH}-CH_3$, $-(CH_2)_3-\underset{H}{\overset{CH_3O}{C}}-(CH_2)_2-$, $-(CH_2)_3-O-(CH_2)_2-O-(CH_2)_3-$, $-CH_2-\underset{H}{\overset{CH_3}{C}}(CH_2)_2\underset{H}{\overset{CH_3}{C}}-CH_2-$, $-CH_2\underset{H}{\overset{CH_3}{C}}(CH_2)_2\underset{H}{\overset{CH_3}{C}}-(CH_2)_2-$, $-(CH_2)_3-\underset{CH_3}{\overset{CH_3}{Si}}-O-\underset{CH_3}{\overset{CH_3}{Si}}-(CH_2)_3-$, $-(CH_2)_4-\underset{CH_3}{\overset{CH_3}{Si}}-O-\underset{CH_3}{\overset{CH_3}{Si}}-(CH_2)_3-$, $-(CH_2)_3-\underset{C_6H_5}{\overset{C_6H_5}{Si}}-O-\underset{C_6H_5}{\overset{C_6H_5}{Si}}-(CH_2)_3-$,

[CH₃-phenyl-Si(CH₃)₂-O-Si(CH₃)₂-phenyl-CH₃], $-(CH_2)_3-\underset{C_6H_5}{\overset{CH_3}{Si}}-O-\underset{C_6H_5}{\overset{CH_3}{Si}}-(CH_2)_3-$, $-(CH_2)_3-\underset{CH_3}{\overset{CH_3}{Si}}-O-\underset{CH_3}{\overset{CH_3}{Si}}-O-\underset{CH_3}{\overset{CH_3}{Si}}-(CH_2)_3-$, $-(CH_2)_3-\underset{CH_3}{\overset{CH_3}{Si}}-O-(\underset{CH_3}{\overset{CH_3}{Si}}-O)_n-\underset{CH_3}{\overset{CH_3}{Si}}-(CH_2)_3-$, (n = 2-15)

[benzene-naphthalene linked structure]

-continued

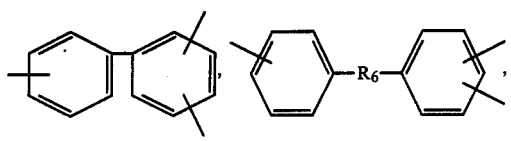

($R_6$ is the same as defined above).

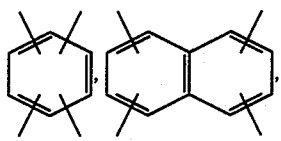

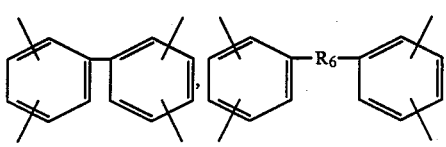

($R_6$ is the same as defined above).

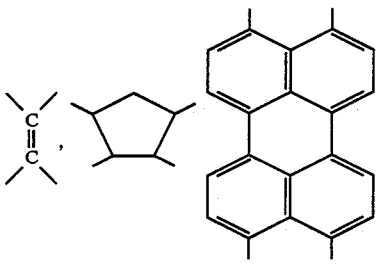

As more preferred examples of $R_1$ and $R_2$, mention may be made of the followings:

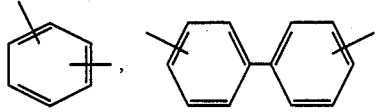

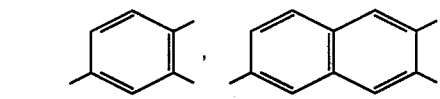

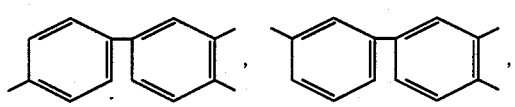

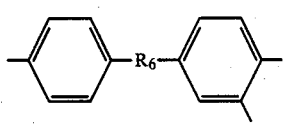

-continued

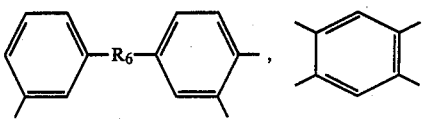

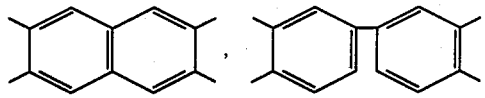

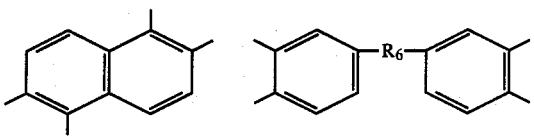

($R_6$ is as defined above).

The above examples are desirable in that they easily form a 5-membered ring and a 6-membered ring in the cyclization reaction.

$R_3$ is a hydrocarbon containing group having 10 to 30 carbon atoms, preferably 16 to 22 carbon atoms.

A preferred example thereof is a monovalent group selected from an aliphatic group, a connecting group of alicyclic group and aliphatic group, a connecting group of aromatic group and aliphatic group, or substituents thereof. As specific examples of $R_3$, mention may be made of the followings:

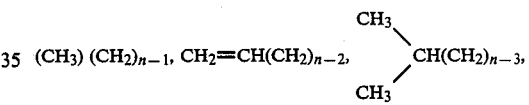

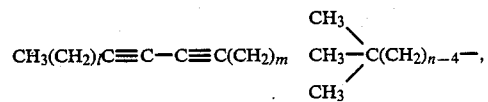

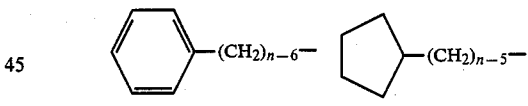

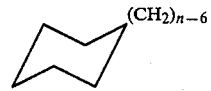

(in which $l+m=n-5$, and n is an integer of from 10 to 30, preferably from 16 to 22).

Particularly preferred examples are straight chain aliphatic hydrocarbon groups.

These groups may be substituted with substitutional groups, such as a halogen atom, a nitro group, an amino group, a cyano group, a methoxy group, an acetoxy group and the like, although they are not critical. Fluorine atom can be preferable as a substituent in some cases since it is capable of imparting higher hydrophobicity to the polymer than hydrogen.

In other words, alkyl groups having a shorter chain can be employed when fluorine atoms are contained therein. For example, in the case of $C_8F_{17}(CH_2)_k$—, (k=2) will be sufficient to obtain a high polymer capable of forming a film.

Specific examples of high polymers employable in the film forming process of the present invention will become apparent by applying the examples of $R_1$, $R_2$, $R_3$, A, B, AB and BA, as well as the modes of substitution of $R_3$, to the formulae (1) to (72). Although the formulae (1) to (72) do not include copolymers, it is a matter of course that copolymeric derivatives and mixtures thereof are included within the scope of the present invention.

Furthermore, although it is not indispensable, the high polymer of the present invention may be substituted by groups having 1 to 9 carbon atoms.

There are no particular limitations to the molecular weight of the high polymer of the present invention. A film can be formed in accordance with the film-forming process of the present invention even when its molecular weight is low. In such a case, however, it may not be possible to attain good heat resistance, mechanical strength and chemical resistance. On the other hand, an excessively high molecular weight is undesirable since it may become difficult to form a film because of an increase in viscosity.

Accordingly, the number average molecular weight is preferably from about 2,000 to about 30,000, most preferably 10,000 to 15,000.

Specific examples of the high polymers of the present invention which are derived from the formulae (1) to (72) are shown below.

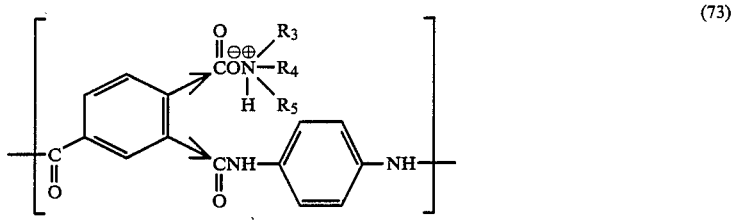

(73)

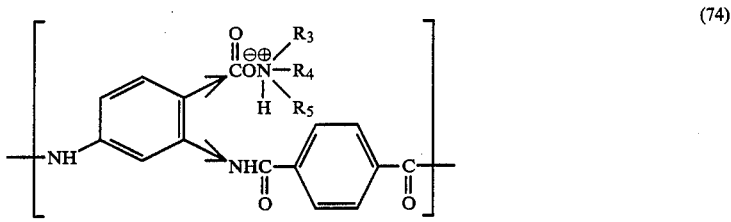

(74)

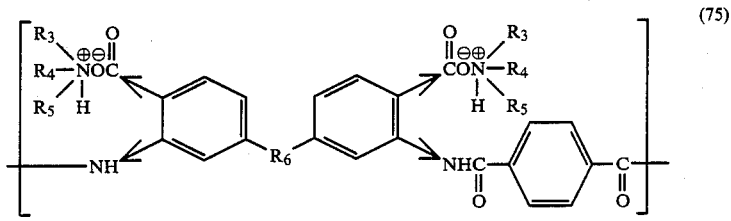

(75)

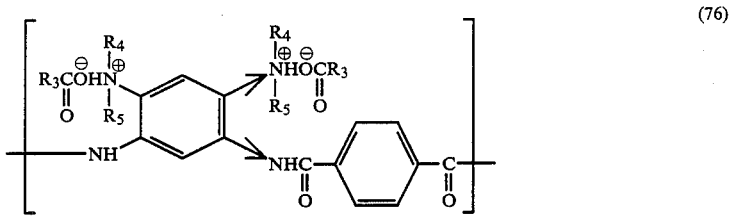

(76)

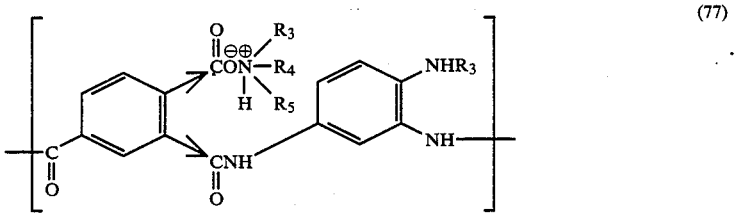

(77)

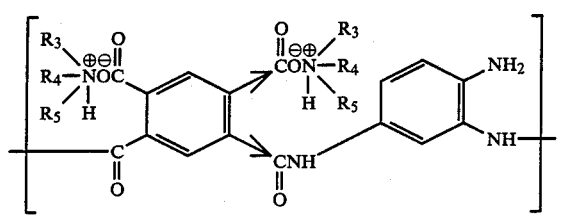
(78)
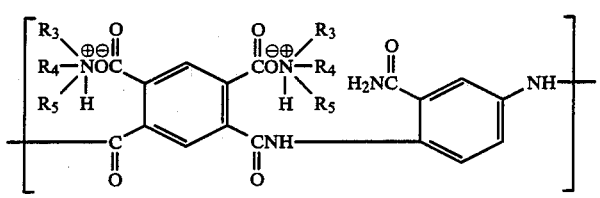
(79)
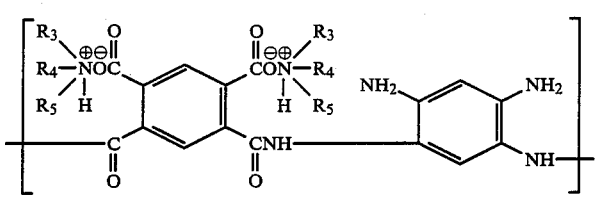
(80)
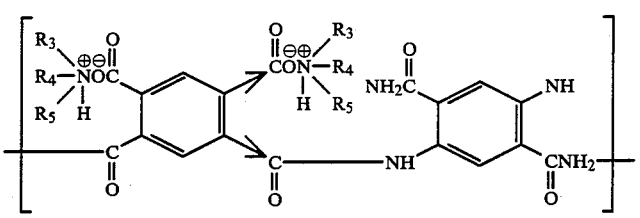
(81)
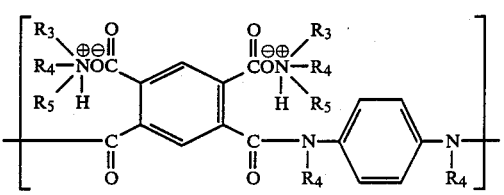
(82)
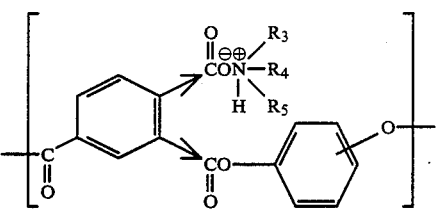
(83)
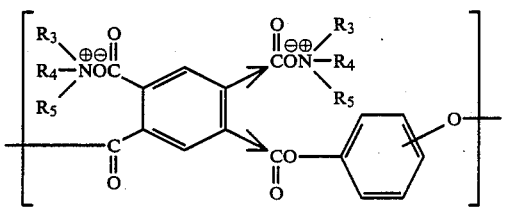
(84)

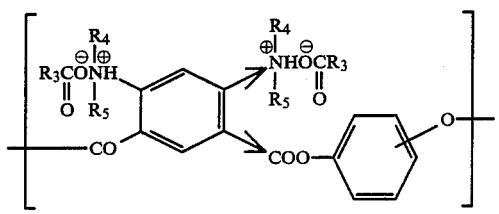
(85)

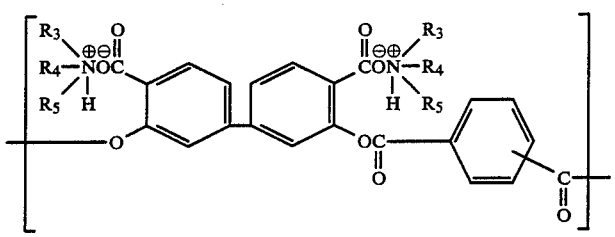
(86)

In the above formulae, "→" indicates isomerism. For instance, formula (73) stands for formulae (73-1) and (73-2) shown below.

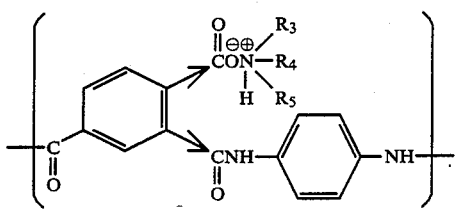
(73)

(73-1)

(73-2)

The present invention includes not only the case where either (73-1) or (73-2) exists but also the case where both of them coexist.

Other examples will be found in books, for example, *Heat Resistance of Polymers* (Mar. 5, 1970) and *Thermal Decomposition and Heat Resistance of Polymers* (Mar. 15, 1974), both edited by Hirotaro Kambe and published by Baifukan Co., Ltd.

A process for production of the above ion bond-containing polymers will hereinafter be explained with reference to the case where in the formula (73), wherein $R_3=CH_3(CH_2)_{17}-$, $R_4=R_5=CH_3$.

Trimellitic acid is acylated with thionyl chloride in an organic polar solvent under substantially anhydrous conditions and then reacted with p-phenylenediamine at a temperature of about 0° to 40° C., preferably about 20° C. to form polyamide acid having a recurring unit represented by the formula:

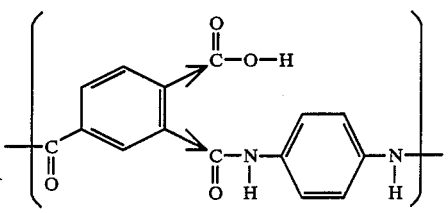

The molecular weight of the formed polyamic acid greatly varies with the reaction conditions employed, such as reaction temperature; purity, degree of purification, and water content of reagents and solvent; ratio of acid component to diamine component; order of addition; and the like.

In order to obtain high molecular weight polymers, it is desirable that the reaction be carried out at low temperatures, using a reagents and solvent of high purity and low water content, and the ratio of the acid component to the diamine component be approached to 1 as close as possible. In a preferred embodiment of the present invention, the polyamide acid salt is not always of high viscosity and, therefore, it can be very easily prepared with no severe control in conditions.

To the polyamide acid thus obtained is added a solution of N-n-octadecyldimethylamine. It is also possible that a solution of N-n-octadecyldimethylamine in a mixed solvent of dimethylacetamide and benzene is mixed with a diluted solution of polyamide acid in a solvent (e.g., a mixture of dimethylacetamide and benzene (1:1)) to form a solution of the salt of the present invention, and that the solution of the salt of the present invention be used as it is, as a spreading solution for the production of LB films.

A process for production of LB films to be used in the present invention will hereinafter be explained.

In a process for forming a Langmuir-Blodgett film, a film-forming material is spread on the surface of water, and the thus spread material is compressed at a certain surface pressure to form a monomolecular film, which is then transferred or laminated onto a substrate by passing the substrate through the film. This is known as the vertical dipping method. Other known processes for forming a Langmuir-Blodgett film include the horizontal dipping method, the revolving cylindrical method, etc. (see *Shin Jikken Kagaku Koza*, Vol. 18 (Surface and Colloids), pp. 498–508). Any conventional processes can be applied to the present invention without any particular restrictions.

The Langmuir-Blodgett process is an excellent method for forming oriented thin films of less than 1,000 Å, or of several hundreds Å or several tens Å. The thickness of the thin films can be controlled with an accuracy of some tens Å and the films formed on a substrate in accordance with the present invention also have the same characteristics. In accordance with this method, it is possible to form a film having a thickness greater than 10,000 Å.

It is known that if the above polymers are mixed with known Langmuir-Blodgett film compounds, the film forming property is improved. This is a preferred embodiment of the present invention.

Known Langmuir-Blodgett film compounds are described in the above-cited references and are well known in the art. In particular, compounds having a hydrocarbon group having about 16 to 22 carbon atoms and a hydrophilic group, as represented by the following formulae are preferred.

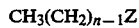

$CH_3(CH_2)_{n-1}Z$

$CH_2=CH(CH_2)_{n-2}Z$

$CH_3(CH_2)_lC\equiv C-C\equiv C(CH_2)_mZ$ (wherein $n=16$ to 22, $l+m=n-5$, and $Z=OH$, $NH_2$, $NHR'$, $NR'R'$, $COOH$, $CONH_2$, $COOR$, etc. (wherein $R'$ is a lower aliphatic hydrocarbon group)).

In improvement of film forming properties, compounds represented by the formula: $CH_3(CH_2)_{n-1}Z$ are excellent from a viewpoint of cost. Compounds having an unsaturated bond have a feature in that they are polymerizable upon irradiation of, e.g., light or radiations.

The mixing ratio of at least compound selected from the above compounds to the polymer is not critical in the present invention.

In spreading the component forming a film on the surface of water according to the Langmuir-Blodgett process, solvents insoluble in water and vaporizable into the gas phase, such as benzene, chloroform and the like, are used. In the case of the polymers of the present invention, it is desired to use organic polar solvents in combination in order to improve the solubility. Preferred organic polar solvents are N,N-dimethylformamide, N,N-dimethylacetamide, N,N-diethylformamide, N,N-diethylacetamide, N,N-dimethylmethoxyacetamide, dimethylsulfoxide, N-methyl-2-pyrrolidone, pyridine, dimethylsulfone, hexamethylphosphoramide, tetramethylensulfone, dimethyltetramethylensulfone and the like.

Accordingly, in a case where the polymer of the present invention and known Langmuir-Blodgett film compound are spread, a mixed solvent of a solvent such as benzene and chloroform and an organic polar solvent is preferably used.

In the case where an organic polar solvent is used in combination with a volatile solvent such as benzene, chloroform, etc., it is presumed that the latter vaporizes into the gaseous phase during the spreading, whereas the former dissolves into the large quantity of water.

There is no particular limitation to a kind of a substrate to be used in the present invention. It depends only on the use or application of the film. Examples of substrates which can be used in the present invention include those made of ordinary inorganic substances, such as glass, alumina, quartz, etc.; those made of metals, plastics and semiconductors of, e.g., Groups IV, III-V and II-VI of the Periodic Table such as Si, GaAs and ZnS; and those made of magnetic materials or ferroelectric materials, such as $PbTiO_3$, $BaTiO_3$, $LiNbO_3$, $LiTaO_3$, etc. It is also possible to use a substrate subjected to a conventional surface treatment.

The adhesion between the high polymer film of the present invention and a substrate can also be improved by applying a silane coupling agent (in particular, a silane coupling agent such as A-1100, A-187, etc., produced by UCC containing an amino group and an epoxy group) or an aluminum chelate to a substrate followed by subjecting it to a heat treatment.

It is a feature of the present invention that a thin film of a polymer having a good heat resistance can be formed on a substrate in accordance with the Langmuir-Blodgett process. It is another feature of the present invention that some of the films can be subjected to a partial or complete ring-closing treatment, in order to further improve the heat resistance of the thin film formed on the substrate.

Of the examples represented by the formulae (73) to (86), the formulae (73) to (82) indicate examples capable of being ring closed, partially or completely, into the 5- or 6-membered ring having a hetero atom. Structures after the ring is completely closed are shown below.

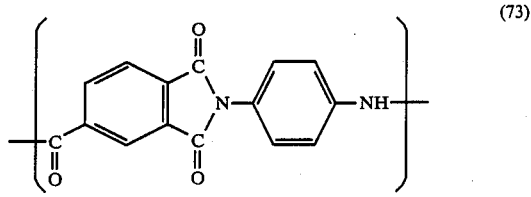

(73)

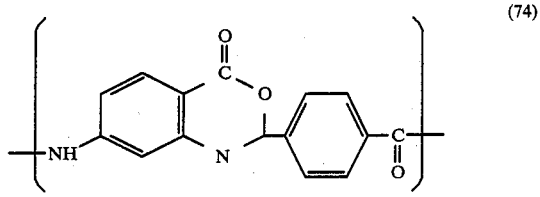

(74)

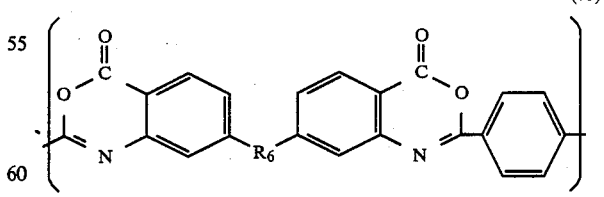

(75)

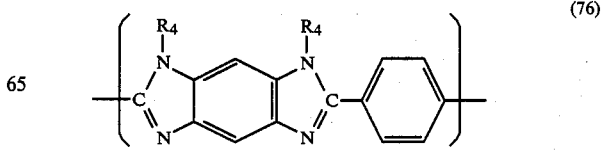

(76)

-continued

(77)
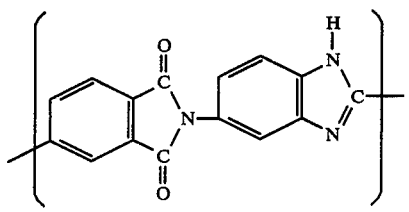

(78)
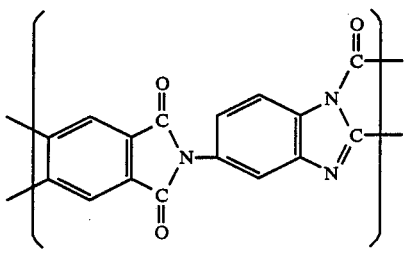

(79)
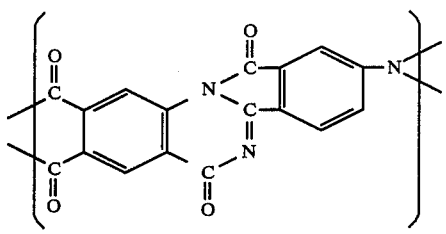

(80)
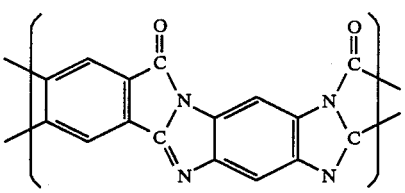

(81)
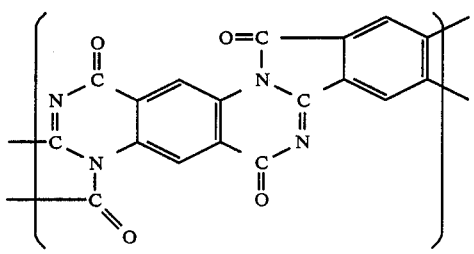

(82)
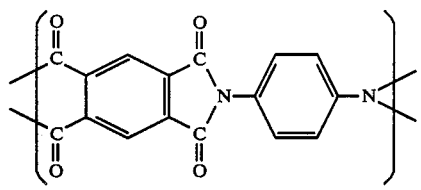

There is no special limitation to the method of the ring closure. It is preferred to use chemical curing agents to be used in curing of polyamic acid, such as acetic anhydride and pyridine. Of course, heat or light may be used in combination.

In order to obtain a thin film having good heat resistance by the ring closure, a known Langmuir-Blodgett film compound to be mixed is preferably selected from the above listed compound which are soluble in solvents under the ring closure conditions.

The use of the thin film will hereinafter be explained.

The thin film of the present invention can be used in a variety of fields, including such fields as electronics, energy conversion and separation of substances, by making use of its characteristics that it has good heat resistance, chemical resistance and physical properties and is in the form of an extremely thin film.

In the field of electronics, the film of the present invention can be used as an optical recording film, a resist film, an insulating film, a thin film for capacitor, an orientation film for liquid crystal, a polarization film, a sensor film, etc., making use of its electrical conductivity, photoconductivity, optical characteristics, electrical insulating properties, thermal characteristics and chemical reactivity. In particular, as an insulating film, the film can be used as an insulating layer in electrical or electronical devices having the structure, such as MIS and MIM, in which as an insulating layer of IC and LSI, various semiconductors and metals are used in combination, and can constitute a field effect transistor, photoelectric converter, light-emitting device, light-receiving device, light-detecting device, hot electron transistor, and the like. In particular, the thin film of the present invention is effective in MIS and MIM devices utilizing the tunnel effect and can be used as an insulating film of Josephson Junction (JJ) device.

In addition, the thin film of the present invention can be expected to be used as a cladding material for waveguide or an optical circuit component.

The thin film of the present invention is thought to be suitable as a protective coating material. Various functions can be realized according to the technique for forming mixed and layered films by using the high polymer of this invention in place of conventional LB materials. Such a mixed or layered film has a variety of uses. For example, a photoelectric converter or a biosensor can be prepared from a film incorporated with a dye or an enzyme.

In addition, the thin film can be expected to be used in separation of substances.

The present invention is described in greater detail with reference to the following examples.

EXAMPLE 1

1.92 g (0.01 mol) of trimellitic anhydride was dissolved in 40 cc of dry hexamethylphosphoramide and then cooled to 0° to 5° C. under a stream of dry nitrogen. Then, 1.19 g of thionyl chloride was dropped, and the resulting mixture was maintained for 1 hour to complete acylation of the trimellitic anhydride. Then, a solution of 1.08 g (0.01 mol) of p-phenylenediamine in dimethylacetamide was dropped at about 20° C., and after the completion of addition, they were reacted for 2 hours.

The reaction mixture was diluted with a mixed solvent of dimethylacetamide and benzene (1:1) to form a solution of $1 \times 10^{-3}$M and the solution was mixed and reacted with a $2 \times 10^{-3}$M solution of N-n-octadecyl dimethylamine in a mixed solvent of dimethylacetamide and benzene (1:1) to prepare a spreading solution for LB films.

In the measurement of the ionic bond containing polymer of this example on redistilled water at 20° C., it was found that when the area per the recurring unit reached about 130 Å$^2$, the surface pressure rose, thereby forming a condensed film. The critical area was about 120 Å². When the film on the surface of water was built-up on an aluminum evaporated glass substrate by the LB method, there was obtained a built-up film of the Z-type. In the FT-IR-ATR analysis of the built-up film, there were observed absorption characteristics of the alkyl group at from 3,000 to 2,800 cm$^{-1}$ and of the salt at from 1,650 to 1,600 cm$^{-1}$, respectively.

When the laminated film was subjected to chemical curing with pyridine and anhydrous acetic acid, the absorptions due to the alkyl group and the salt disappeared and an absorption due to the imido bond appeared. This clearly shows that the imidization reaction occurred.

EXAMPLE 2

2.18 g (0.01 mol) of pyromellitic acid dianhydride was added to 50 cc of dry dimethylacetamide in a flask, and 1.51 g (0.01 mol) of 2,5-diaminobenzamide dissolved in 30 cc of dimethylacetamide was dropped at about 20° C. under a stream of dry nitrogen over about 10 minutes, and the reaction was allowed to continue for 2 hours after completion of the dropping. The reaction mixture was diluted with a mixed solvent of dimethylacetamide and benzene (1:1) to form a solution of $1\times10^{-3}$M and the solution was mixed and reacted with a $2\times10^{-3}$M solution of N-n-octadecyl dimethylamine in a mixed solvent of dimethylacetamide and benzene (1:1) to prepare a spreading solution for LB films.

The surface pressure-area curve of the ionic bond containing polymer of this example was obtained by measuring at 20° C. on the surface of redistilled water. When the area per the recurring unit approached to about 150 Å², the surface pressure rose, thereby forming a condensed film. The critical surface area was about 140 Å². When the film on the surface of water was built-up on an aluminum evaporated glass substrate by the LB method to obtain a built-up film of the Z-type.

EXAMPLE 3

2.72 g (0.01 mol) of benzidine-3,3'-dicarboxylic acid was dissolved in 50 cc of dry hexamethylphosphoramide under a stream of dry nitrogen in a flask, and 2.03 g (0.01 mol) of terephthalic acid dichloride dissolved in 30 cc of dry dimethylacetamide was dropped at about 20° C. and the reaction was allowed to continue for about 2 hours after completion of dropping. The reaction mixture was diluted with a mixed solvent of dimethylacetamide and benzene (1:1) to form a solution of $1\times10^{-3}$M and the solution was mixed and reacted with a $2\times10^{-3}$M solution of N-n-octadecyl dimethylamine in a mixed solvent of dimethylacetamide and benzene (1:1) to prepare a spreading solution for LB films.

The surface pressure area curve of the ionic bond containing polymer of this example was measured on the surface of redistilled water at 20° C. When the area per the recurring unit approached to about 140 Å², the surface pressure sharply rose, thereby forming a condensed film. The critical surface area was about 130 Å². The film on the surface of water was built-up on an aluminum evaporated glass substrate by the LB method to obtain a built-up film of the Z-type.

A thin film can be formed by the LB method using the ionic bond-containing polymer of the present invention. When the LB film thus obtained is subjected to the ring closure reaction, there can be obtained an ultra thin film which is good in heat resistance and electrical characteristics, and in chemical resistance and mechanical characteristics, and which has a thickness of not more than 10,000 Å, and if desired, 10 to 1,000 Å.

What is claimed is:

1. An ionic bond containing polymer having a linear recurring unit selected from the group consisting of

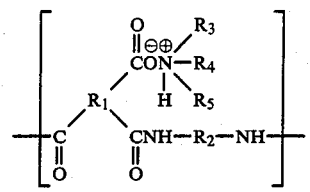

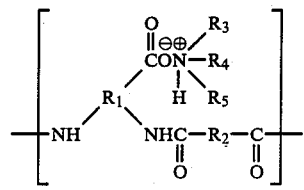

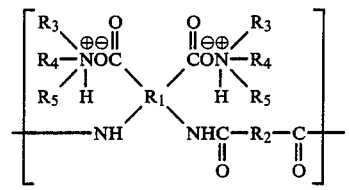

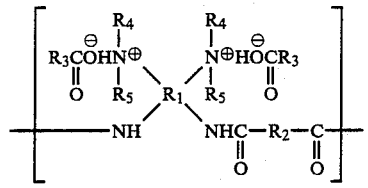

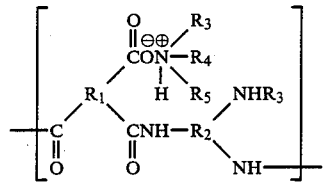

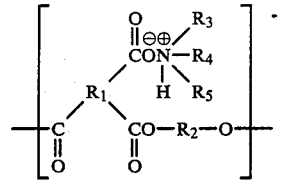

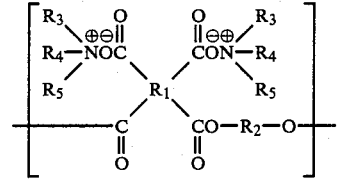

-continued

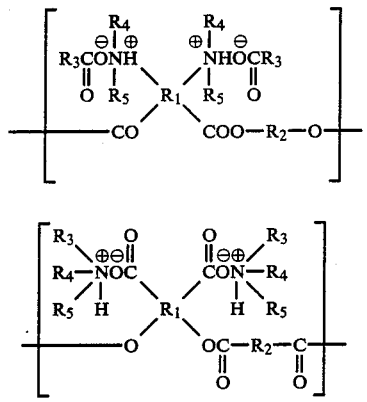

in which
R$_1$ and R$_2$ are each organic groups having at least two carbon atoms,
R$_3$ is a hydrocarbon group having 10-30 carbon atoms,
each R$_4$ and R$_5$ is hydrogen or a hydrocarbon group having 1-30 carbon atoms, and
wherein each hydrocarbon group may be substituted by halogen, nitro, amino, cyano, methoxy or acetoxy.

2. The polymer of claim 1 wherein the recurring unit contains two R$_3$ groups.

3. The polymer of claim 1 wherein any one or both of the organic groups R$_1$ and R$_2$ is a benzenoid group having at least 6 carbon atoms.

4. The polymer of claim 1 wherein the hydrocarbon group R$_3$ is an aliphatic group, a group resulting from bonding an alicyclic group and an aliphatic group, a group resulting from bonding an aromatic group and an aliphatic group, or each of the above groups which is substituted.

5. The polymer of claim 1 wherein the recurring unit is a precursor for forming a 5- or 6-membered ring containing a hetero atom.

6. The polymer of claim 5 wherein the 5- or 6-membered ring containing a hetero atom is formed by curing a built-up film.

7. The polymer of claim 1 wherein the number of carbon atoms of the hydrocarbon group R$_3$ is from 16 to 22.

8. The polymer of claim 2 wherein any one or both of organic groups R$_1$ and R$_2$ is a benzenoid group having at least 6 carbon atoms.

9. The polymer of claim 2 wherein the hydrocarbon group R$_3$ is an aliphatic group, a group resulting from bonding an alicyclic group and an aliphatic group, a group resulting from bonding an aromatic group and an aliphatic group, or each of the above groups which is substituted.

10. The polymer of claim 2 wherein the recurring unit is a precursor for forming a 5- or 6-membered ring containing a hetero atom.

11. The polymer of claim 2 wherein the number of carbon atoms of the hydrocarbon group R$_3$ is from 16 to 22.

12. The polymer of claim 1 wherein both organic groups R$_1$ and R$_2$ are benzenoid groups having at least 6 carbon atoms; hydrocarbon group R$_3$ is an optionally substituted aliphatic group, an alicyclic-aliphatic group, an aromatic aliphatic group; and the recurring unit is a precursor for forming a 5- or 6-membered ring containing a hetero atom.

* * * * *